United States Patent
Cabaud, III et al.

(10) Patent No.: US 12,210,824 B1
(45) Date of Patent: Jan. 28, 2025

(54) AUTOMATED INFORMATION EXTRACTION FROM ELECTRONIC DOCUMENTS USING MACHINE LEARNING

(71) Applicant: Now Insurance Services, Inc., Houston, TX (US)

(72) Inventors: Philip Graeme Cabaud, III, Houston, TX (US); Eric Chen, Carlsbad, CA (US); Ari Brett Lew, Carlsbad, CA (US); Eduardo Santos Mena, Sombrerete (MX); Alberto de Obeso Orendain, Zapopan (MX)

(73) Assignee: Now Insurance Services, Inc., Houston, TX (US)

( * ) Notice: Subject to any disclaimer, the term of this patent is extended or adjusted under 35 U.S.C. 154(b) by 449 days.

(21) Appl. No.: 17/661,514

(22) Filed: Apr. 29, 2022

Related U.S. Application Data

(60) Provisional application No. 63/182,523, filed on Apr. 30, 2021.

(51) Int. Cl.
  *G06F 40/205* (2020.01)
  *G06N 5/022* (2023.01)

(52) U.S. Cl.
  CPC .......... *G06F 40/205* (2020.01); *G06N 5/022* (2013.01)

(58) Field of Classification Search
  CPC .............................. G06F 40/205; G06N 5/022
  USPC .............................................................. 704/9
  See application file for complete search history.

(56) References Cited

U.S. PATENT DOCUMENTS

| | | | | |
|---|---|---|---|---|
| 5,410,475 A | * | 4/1995 | Lu .......................... | G06F 40/295 715/236 |
| 5,526,443 A | * | 6/1996 | Nakayama ............ | G06F 16/338 707/E17.084 |
| 5,721,939 A | * | 2/1998 | Kaplan ................. | G06F 40/284 704/9 |

(Continued)

OTHER PUBLICATIONS

Wei Zhuang, "Architecture of Knowledge Extraction System based on NLP," 2021 International Conference on Aviation Safety and Information Technology, Dec. 2021, pp. 294-297. https://dl.acm.org/doi/10.1145/3510858.3510950.

(Continued)

*Primary Examiner* — Thuykhanh Le
(74) *Attorney, Agent, or Firm* — Kowert, Hood, Munyon, Rankin & Goetzel, P.C.; Dean M. Munyon

(57) ABSTRACT

A method of automatically extracting information from electronic documents is discussed. The method includes a computer system receiving a plurality of electronic documents of a particular type that includes information arranged in a plurality of different formats. The method further includes, for each of a set of electronic documents, the computer system analyzes the electronic documents to identify tokens within the electronic documents, identifies a plurality of points-of-interest within the electronic documents, and matches points-of-interest based on distance between points-of-interest and a determination by a natural language processing model that the points-of-interest correspond. The method further includes generating revised versions of the electronic documents in which the matched points-of-interest are arranged in a universal format and storing the revised versions of the electronic documents.

20 Claims, 7 Drawing Sheets

(56) References Cited

U.S. PATENT DOCUMENTS

| | | | | |
|---|---|---|---|---|
| 5,778,397 | A * | 7/1998 | Kupiec | G06F 16/345 |
| | | | | 715/255 |
| 5,819,265 | A * | 10/1998 | Ravin | G06F 40/295 |
| | | | | 707/999.005 |
| 5,832,480 | A * | 11/1998 | Byrd, Jr. | G06F 16/90344 |
| | | | | 707/999.005 |
| 5,991,713 | A * | 11/1999 | Unger | H03M 7/3084 |
| | | | | 704/9 |
| 6,076,051 | A * | 6/2000 | Messerly | G06F 16/3344 |
| | | | | 707/999.005 |
| 6,466,901 | B1 * | 10/2002 | Loofbourrow | G06F 16/313 |
| | | | | 704/9 |
| 6,842,730 | B1 * | 1/2005 | Ejerhed | G06F 40/211 |
| | | | | 707/999.005 |
| 7,302,383 | B2 * | 11/2007 | Valles | G06F 40/30 |
| | | | | 704/231 |
| 7,565,282 | B2 * | 7/2009 | Carus | G10L 15/063 |
| | | | | 704/251 |
| 7,822,598 | B2 * | 10/2010 | Carus | G06F 40/30 |
| | | | | 704/9 |
| 7,822,621 | B1 * | 10/2010 | Chappel | G06Q 10/10 |
| | | | | 706/45 |
| 7,937,263 | B2 * | 5/2011 | Carrier | G06F 40/284 |
| | | | | 704/10 |
| 8,250,046 | B2 * | 8/2012 | Heymans | G06F 16/3337 |
| | | | | 707/703 |
| 8,533,208 | B2 * | 9/2013 | Sundaresan | G06F 16/3344 |
| | | | | 707/804 |
| 8,612,208 | B2 * | 12/2013 | Cooper | G06F 16/3338 |
| | | | | 704/9 |
| 8,930,178 | B2 * | 1/2015 | Pestian | G16H 70/60 |
| | | | | 704/10 |
| 11,106,906 | B2 | 8/2021 | Bassu et al. | |
| 11,210,468 | B2 * | 12/2021 | Patel | G06F 18/29 |
| 11,227,183 | B1 | 1/2022 | Connors et al. | |
| 11,321,538 | B1 | 5/2022 | Fontecilla | |
| 11,328,524 | B2 * | 5/2022 | Cristescu | G06V 30/414 |
| 11,461,407 | B1 | 10/2022 | Schafer et al. | |
| 11,615,246 | B2 * | 3/2023 | Reisswig | G06F 16/367 |
| | | | | 704/9 |
| 11,694,100 | B2 * | 7/2023 | Cobb | G06F 17/16 |
| | | | | 704/9 |
| 11,774,264 | B2 * | 10/2023 | Aït-Mokhtar | G06F 16/338 |
| | | | | 707/918 |
| 11,783,005 | B2 * | 10/2023 | Cobb | G06F 40/289 |
| | | | | 706/50 |
| 11,948,558 | B2 * | 4/2024 | Ribas Machado das Neves | H04L 51/18 |
| 2004/0083091 | A1 * | 4/2004 | Le | G06F 40/194 |
| | | | | 704/9 |
| 2007/0061348 | A1 * | 3/2007 | Holland | G06F 40/237 |
| | | | | 715/201 |
| 2007/0219776 | A1 * | 9/2007 | Gamon | G06F 40/20 |
| | | | | 704/9 |
| 2009/0070103 | A1 * | 3/2009 | Beggelman | G06F 40/20 |
| | | | | 704/9 |
| 2009/0306962 | A1 * | 12/2009 | Harlow | G06F 40/289 |
| | | | | 704/9 |
| 2012/0197631 | A1 * | 8/2012 | Ramani | G06F 40/30 |
| | | | | 704/9 |
| 2013/0138425 | A1 * | 5/2013 | Luke | G06F 40/284 |
| | | | | 704/9 |
| 2013/0262089 | A1 * | 10/2013 | Whitman | G06F 16/93 |
| | | | | 704/9 |
| 2014/0163964 | A1 * | 6/2014 | Chen | G06F 40/237 |
| | | | | 704/9 |
| 2014/0278364 | A1 * | 9/2014 | Grosset | G06F 16/353 |
| | | | | 704/9 |
| 2015/0081277 | A1 * | 3/2015 | Behi | G06F 40/205 |
| | | | | 704/9 |
| 2015/0309992 | A1 * | 10/2015 | Visel | G06F 40/30 |
| | | | | 704/9 |
| 2016/0170952 | A1 * | 6/2016 | Carrier | G06F 40/186 |
| | | | | 704/9 |
| 2019/0147042 | A1 * | 5/2019 | Raghavan | G06F 40/56 |
| | | | | 706/11 |
| 2020/0151591 | A1 | 5/2020 | Li | |
| 2020/0175015 | A1 * | 6/2020 | Al Hasan | G06F 16/355 |
| 2020/0293714 | A1 | 9/2020 | Olshanetsky et al. | |
| 2021/0004441 | A1 * | 1/2021 | Sapugay | G06F 16/3329 |
| 2021/0326534 | A1 * | 10/2021 | Wang | G06F 16/908 |
| 2021/0357633 | A1 | 11/2021 | Bade et al. | |
| 2021/0383067 | A1 | 12/2021 | Reisswig | |
| 2022/0092097 | A1 | 3/2022 | Gupta | |
| 2022/0179892 | A1 * | 6/2022 | Kermode | G06N 3/08 |
| 2022/0229983 | A1 | 7/2022 | Zohrevand et al. | |
| 2022/0230013 | A1 | 7/2022 | Krishnamurthy | |
| 2022/0237230 | A1 | 7/2022 | Zovic et al. | |
| 2022/0253729 | A1 * | 8/2022 | Vashist | G06N 5/04 |
| 2022/0292258 | A1 | 9/2022 | Zeng et al. | |
| 2022/0309109 | A1 * | 9/2022 | Benincasa | G06F 16/316 |
| 2022/0327138 | A1 * | 10/2022 | Benincasa | G06F 40/284 |
| 2023/0129874 | A1 * | 4/2023 | Torres | G06V 10/40 |
| | | | | 704/9 |
| 2023/0290344 | A1 * | 9/2023 | Cavallari | G06F 40/205 |
| 2024/0071375 | A1 * | 2/2024 | Singh | G10L 15/1815 |

OTHER PUBLICATIONS

Sandeep Tata, et al., "Glean: structured extractions from templatic documents," Proceedings of the VLDB Endowment, vol. 14, Issue 6, Feb. 2021, pp. 997-1005. https://dl.acm.org/doi/10.14778/3447689.3447703.

Zhenyu Zhang, et al. "Layout-Aware Information Extraction for Document-Grounded Dialogue: Dataset, Method and Demonstration," Proceedings of the 30th ACM International Conference on Multimedia, Oct. 2022, pp. 7252-7260. https://dl.acm.org/doi/10.1145/3503161.3548765.

Xinya Su, "Towards More Intelligent Extraction of Information from Documents," Cornell University, ProQuest Dissertations Publishing, Aug. 2021, 28713544, 156 pages. https://www.proquest.com/docview/2581838694.

* cited by examiner

AUTOMATED INFORMATION EXTRACTION FROM ELECTRONIC DOCUMENTS USING MACHINE LEARNING

CROSS-REFERENCE TO RELATED APPLICATION

The present application claims the benefit of U.S. Provisional Appl. No. 63/182,523 filed on Apr. 30, 2021, which is incorporated by reference herein in its entirety.

BACKGROUND

Technical Field

This disclosure relates generally to processing electronic documents, and in particular extracting information from electronic documents using one or more machine learning algorithms.

Description of the Related Art

In contrast to documents prepared using standardized forms promulgated by a government agency or a standard-setting organization, various documents prepared by various entities may be structured in any of a number of ways according to any of a number of different formats. For example, information may be contained in tables with labels on rows, columns, or both. In another example, information may be contained in paragraphs of prose text. In still another example, information may be contained in graphics.

Information that is extracted from such documents may be used as input for various machine learning algorithms to, for example, identify trends or clusters within the information or to predict future events. Such machine learning algorithms, however, are trained to evaluate information that is stored in a particular format and may not be able to analyze information contained in documents that use different formats.

Figure 1:
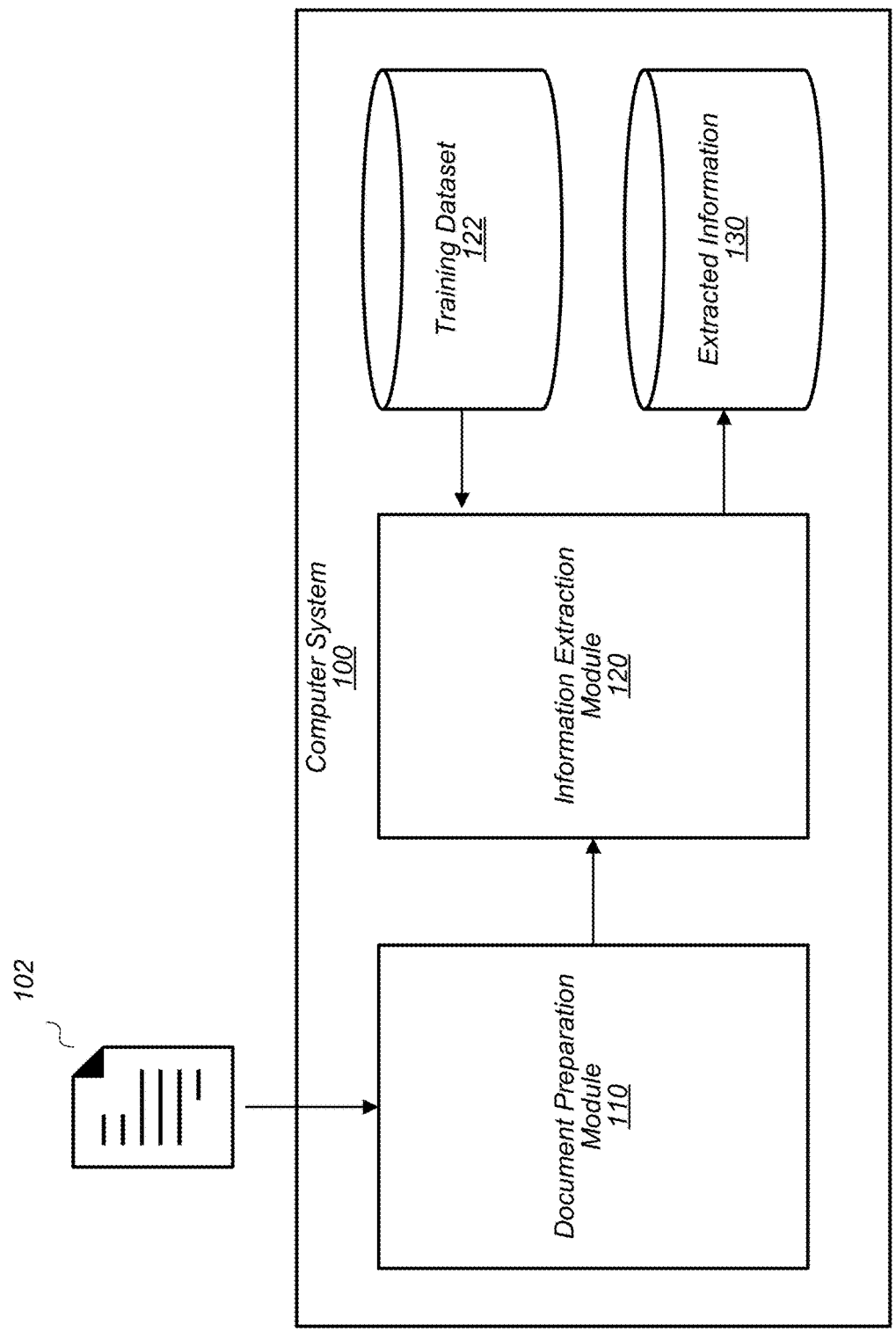
FIG. 1 is a block diagram illustrating an embodiment of a computer system configured to extract information from electronic documents.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to analyze an electronic document" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112 (f) for that claim element. Accordingly, none of the claims in this application as filed are intended to be interpreted as having means-plus-function elements. Should Applicant wish to invoke Section 112 (f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" electronic document would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

In this disclosure, various "modules" operable to perform designated functions are shown in the figures and described in detail (e.g., document preparation module 110, an information extraction module 120, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

DETAILED DESCRIPTION

Extracting information from documents that may include information in any of a number of formats and structuring the extracted information into a format that associates labels with data and can be used for subsequent data analysis can be a labor-intensive process if done manually. In various instances, for example, information that is useable to perform data analysis may be buried in any of a number of locations in a voluminous document. For example, important information in a first document may be included in a paragraph on page fifty of a one-hundred-page document, and important information from a second document may be included in the fourth row of a table on page twenty of a seventy-page document. An analyst who is knowledgeable about the kind of information that is useable for data analysis might have to examine each page of each document carefully to extract the sought information. Such labor may be both expensive and the results may be unreliable.

To remedy some or all of these deficiencies of prior information extraction techniques, the inventors propose techniques employing a natural language processing (NLP) algorithm (implemented by various implementations of neural network in various embodiments) to identify the useable information from the documents that may be in any of a number of formats. In various embodiments, supervised training techniques are used to augment the NLP algorithm using examples of the particular type of document having various formats. In various embodiments, such supervised training includes providing the NLP algorithm with training data about what kind of information (e.g., words, numbers, etc.) is used in the particular type of document to represent labels and what kind of information (e.g., words, numbers, etc.) is used in the particular type of document to represent data. After being trained, the NLP is applied to documents having information to be extracted and is used to identify points-of-interest (PoIs) within the documents. The NLP is also operable to classify PoIs as label PoIs and data PoIs. In various embodiments, the NLP algorithm is then used to match label PoIs with data PoIs using a spatial analysis of the orientation of label PoIs and data PoIs within the documents and/or a coherence analysis between the label PoIs and data PoIs. By employing these techniques, information may be extracted from documents automatically and in a scalable manner (i.e., if the number of documents to be processed increases, these documents can be processed by adding additional computer resources to implement the data extraction techniques).

In addition to facilitating information extraction in a scalable and automatic manner, these techniques also allow computer resources to be used more efficiently. In various embodiments, the amount of memory used to store the documents is substantially more than the amount of memory used to store the information extracted from the documents. In various instances, the documents are electronically scanned copies of paper documents that include visual information and the extracted information is textual information. Once the textual information is extracted, memory used to store the visual information may be used for other purposes. Additionally, because in various instances the documents include information that is not extracted such as letterhead, page numbers, or any other information that is not the kind of information the NLP algorithm is trained to extract, the textual information extracted by the NLP algorithm is less than the total amount of textual information contained in the documents. Accordingly, the amount of memory used to store the extracted information is less than an amount of memory used to store all of the textual information in the document.

Referring now to FIG. 1, a block diagram is shown illustrating various embodiments of a computer system 100 configured to extract information from electronic documents 102. In various embodiments, computer system 100 includes a document preparation module 110, an information extraction module 120, a training database 122, and extracted information 130 that has been extracted from electronic documents 102 as discussed herein. In various embodiments, computer system 100 may be implemented by various types of suitable computer systems including but not limited to one or more servers, laptop computers, desktop computers, tablet computers, or smartphones. In various embodiments, computer system 100 may be implemented by a plurality of computer systems working together in a cloud in which the various tasks discussed herein are distributed. In FIG. 1, document preparation module 110 and information extraction module 120 are shown as two separate modules, but it will be understood that in various embodiments the functionality of both discussed herein may be performed by a single computer program. Similarly, while training dataset 122 and extracted information 130 are represented as separate data stores in FIG. 1, it will be understood that training dataset 122 and extracted information 130 may be stored in the same datastore in various embodiments.

Computer system 110 is operable to receive a plurality of electronic documents 102. In various embodiments, electronic documents 102 are documents of a particular type and include information arranged in a plurality of different formats. In some embodiments, electronic documents 102 are various types of reports generated by different entities using different formats, but that contain similar types of information. For example, electronic documents 102 may be reports about insurance claims with similar information (e.g., dates, claimants, amounts) but arranged in different formats (e.g., some may be in tables, others in prose) that have been generated by different entities (e.g., different insurance companies). In another example, electronic documents 102 may be incident reports relating to security breaches within computer networks that include information (e.g., time logs, event codes, error messages) arranged in different formats because the computer systems generating the reports run different operating systems. In various embodiments, some or all electronic documents 102 are digitally native documents that were generated using computer systems. Additionally or alternatively, some or all electronic documents 102 are electronically-scanned paper documents (i.e., documents that existed on paper that were scanned by computer systems).

Document preparation module 110 is operable to analyze electronic documents 102 to identify tokens within particular electronic documents. As discussed in further detail in reference to FIG. 2, document preparation module 110 is operable to convert electronic documents 102 into sets of pixels and identify groups of pixels document preparation module 110 determines correspond to a character. Such groups of pixels are referred to herein as "tokens."

In various embodiments, information extraction module 120 is operable to receive output from document preparation module 110 to identify a plurality of data points-of-interest (PoI) and label PoIs from among the identified tokens using one or more natural language processing algorithms. In various embodiments, the one or more natural language processing algorithms are trained using training electronic documents in training dataset 122. The training electronic documents in training dataset 122 are of the same type as electronic documents 102 (e.g., the training electronic documents are electronic documents 102 are the same type of reports). As used herein, "data PoIs" refers to groups of tokens (e.g., letters, numbers, a combination of letters and numbers) that information extraction module 120 has determined relates to the subject matter of the particular electronic document 102. For example, if a particular electronic document 102 is a report that describes a particular incident, corresponding data PoIs could be groups of tokens that describe the time and setting of the particular incident, what occurred, who or what was involved, the aftermath of the particular incident, etc. As used herein, "label PoIs" refers to groups of tokens (e.g., letters, numbers, a combination of letters and numbers) that information extraction module 120 has determined corresponds to one or more data PoI. For example, if a particular data PoI is "May 16, 2015" a corresponding label PoI may be "Date." As another example, if a particular data PoI is "Acme Inc." a corresponding label PoI may be "Claimant." As discussed in further detail herein, in various embodiments information extraction module 120 determines matches between data PoIs and label PoIs. In various embodiments, the matching of a given data PoI with a given label PoI is based on (a) a distance between the given data PoI and the given label PoI within the particular electronic document 102 and (b) a determination by the natural language processing algorithm that one or more tokens of the given data PoI corresponds to one or more tokens of the given label PoI.

Information extraction module 120 is operable to store extracted information 130 (e.g., data PoIs, label PoIs, indications of matches between data PoIs and label PoIs) in a datastore. In various embodiments, extracted information 130 from a particular electronic document 102 includes a revised version of the particular electronic document 102 that includes the matched data PoIs and label PoIs arranged in a universal format (e.g., in a table) that does not include identified tokens that were not classified as data PoIs or label PoIs. In various embodiments, such revised versions of the electronic documents 102 utilize less computer memory in computer system 110 than the plurality of electronic documents. Information extraction module 120 is discussed in additional detail in reference to FIG. 3. The training of the one or more natural language processing algorithms is discussed in additional detail in reference to FIG. 4. Examples of data PoIs and label PoIs are discussed in reference to FIGS. 5A-5D.

Accordingly, computer system 100 is operable to extract information from a plurality of electronic documents 102 and render the extracted information in a universal format despite different formatting in the various electronic documents 102. In various instances, such extraction may be performed with little to no intervention by a human operator, saving labor costs and increasing the processing speed of electronic documents 102. Further, because the extracted information 130 may be rendered in a universal format, such extracted information 130 may be fed to other data processing algorithms (e.g., algorithms that analyze the extracted information to make one or more decisions such predicting future events based on prior events described in the electronic documents). Accordingly, the techniques discussed herein relate to ingestion of data such that other algorithms may be used to analyze such data.

Figure 2:
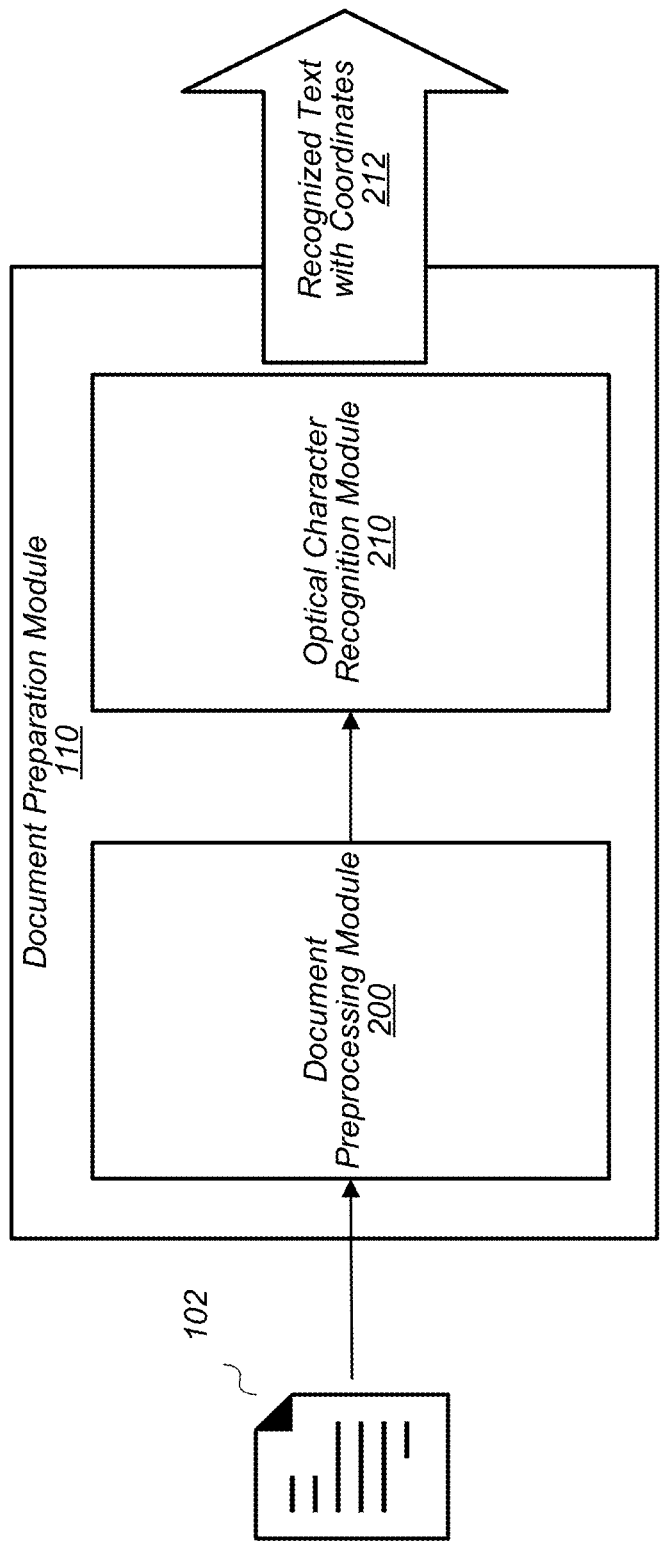
FIG. 2 is an expanded block diagram of the document preparation module of FIG. 1 in accordance with various embodiments.

Referring now to FIG. 2, an expanded block diagram illustrating various embodiments of document preparation module 110 is shown. In the embodiment shown, document preparation module 110 is operable to receive one or more electronic documents 102, process the electronic documents with a document preprocessing module 200 and an optical character recognition module 210, and output (e.g., to information extraction module 120) recognized text with coordinates (arrow 212).

In various embodiments, document preprocessing module 200 is operable to convert electronic documents 102 into one or more images. As discussed herein, electronic documents 102 may be stored as any of a number of suitable file types (e.g., .PDF files, .TIF files, .JPEG files). In various embodiments, document preprocessing module 200 is operable to convert the electronic documents 102 into individual images (e.g., one image per page of the electronic documents 102) that have a uniform file type (e.g., .PNG, .TIF, .JPEG, etc.). It will be understood that the operations performed by document preprocessing module 200 may be tailored to the requirements of the optical character recognition algorithm implemented by optical character recognition module 210.

In various embodiments, optical character recognition module 210 is operable to identify the tokens within the one or more images prepared by document preprocessing module 200. Any suitable optical character recognition algorithm may be used (e.g., the Tesseract optical character recognition engine distributed under the Apache License). Optical character recognition module 210 is also operable to determine coordinates (e.g., X and Y axis coordinates) of the identified tokens within the one or more images. In various embodiments, coordinates for a given token may be set at the center of the token, the top left of the token, the top right of the token, or at any other suitable place. Thus, document preparation module 110 is operable to take as input electronic documents 102 stored in any of a number of formats and provide as output a data structure containing tokens that were recognized within electronic documents 102 with location information describing where in the electronic documents 102 the recognized tokens were identified.

Figure 3:
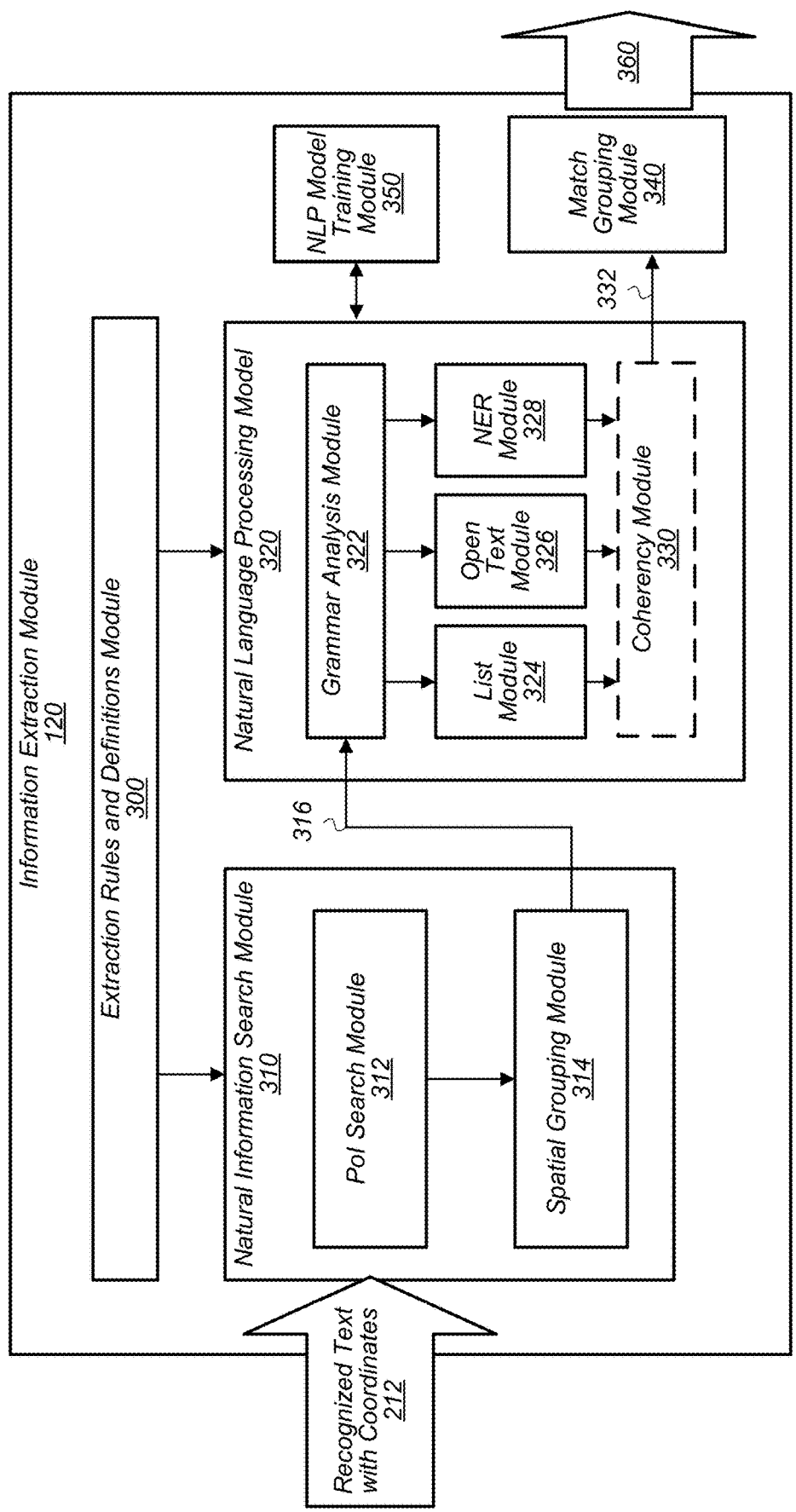
FIG. 3 is an expanded block diagram of the information extraction module of FIG. 1 in accordance with various embodiments.

Referring now to FIG. 3, an expanded block diagram illustrating various embodiments of information extraction module 120 is shown. In the embodiment shown in FIG. 3, information extraction module 120 includes an extraction rules and definitions module 300, a natural information search module 310, a natural language processing (NLP) model 320, a match grouping module 340, and an NLP algorithm training module 350.

In various embodiments, extraction rules and definition module 300 implements rules and definitions input by a user that govern the information extraction techniques discussed herein. In various embodiments, rules configure the execution of natural information search module 310 and/or NLP model 320. For example, a first rule may specify that PoIs having fewer than 3 characters can be disregarded from further analysis. A second rule may specify that vertical matches between PoIs should be weighted more heavily than horizontal matches for PoIs identified in a particular set of electronic documents 102. A third rule may increase a minimum or maximum spatial distance threshold used to match PoIs. (A distance threshold can be estimated, for example, based on the distribution of distances between words or sentences.) In various embodiments, definitions specify particular meanings for particular PoIs that are likely to be found in the electronic documents 102. For example, if a corpus of electronic documents 102 includes many instances of "Orange, California," a definition can be input to ensure that instances of "Orange" are recorded as data PoIs and matched with a label PoI associated with geography such as "City" or "Place". As another example, the word "insurer" may be specifically defined as a label PoI that corresponds to the name of an entity. The word "insurer" as an entity can be related to Persons or Organizations. In addition, the word "insurer" can have different synonyms such as insurer name, entity name (do not confuse with entity). Also, the context of the sentence helps improve the identification of entities. For example, the address 1314 DOUGLAS ST STE 1400 is detected as an "Location" even when integers and names are contained in the sentence. Accordingly, rules and definitions may be used to modify the performance of NLP model to correct incorrect groupings between POIs, to tailor the information extraction processing used on a particular set of electronic documents, or to adjust the execution speed of information extraction (by increasing or reducing the number of candidate PoI matches considered).

In various embodiments, natural information search module 310 is operable to take as input recognized text with coordinates (arrow 212), parse the text to identify candidate PoIs from among the text (i.e., potential data PoIs and potential label PoIs), determine spatial groupings between candidate PoIs to combine candidate PoIs together, and output the candidate PoIs to NLP model 320 (indicated by line 316). In the embodiments shown in FIG. 3, natural information search module 310 includes a PoI search module 312 that is operable to identify candidate PoIs and a spatial grouping module 314 that is operable to determine whether candidate PoIs should be grouped together (e.g., PoIs that share a horizontal coordinate may be grouped together).

In various embodiments, PoI search module 312 may use a dictionary to identify groups of a tokens that may correspond to candidate PoIs. Because text is generally horizontally oriented (i.e., tokens in a word share vertical coordinates) or vertically oriented (i.e., tokens in a word share horizontal coordinates), PoI search module 312 is operable to identify strings of text that share coordinates that match a word in the dictionary in various embodiments. Similarly, PoI search module 312 is operable to identify strings of numbers that share coordinates in various embodiments. In various embodiments, PoI search module 312 may also include tokens that have been identified as non-alphanumeric characters such as punctuation (e.g., commas, periods, slashes) or other special characters in a candidate PoI. In various embodiments, how non-alphanumeric characters may be configured using one or more rules (e.g., a rule including slashes and hyphens into strings of numbers that frequently are dates in the electronic documents). Thus, the tokens comprising the word "closed" may be identified as a first candidate PoI, the tokens comprising "Sep. 14, 2012" may be identified as a second candidate PoI, the tokens comprising "insurer" may be identified as a third candidate PoI, and so on. In various embodiments, candidate PoIs may only represent a minority of the text that was recognized in an electronic document 102. Such non-PoI text may be used to determine the coherence between PoIs as discussed below.

In various embodiments, spatial grouping module 314 is operable to (a) perform a mathematical analysis of the spatial distribution of candidate PoIs to associate the coherence of the spatial relationship between the PoIs and the rest of the text extracted by document preparation module 110 and/or (b) to search for the natural distribution of PoIs and text to augment the model for the spatial relationship between candidate PoIs with the way text is associated in language (e.g., in English text flows leftward and downward such that PoIs that are spatially proximate and flow according to standard grammatical orientation may be related). In various instances, spatial grouping module 314 is operable to group intersecting groups of tokens. As discussed herein, groups of tokens "intersect" by being spatially adjacent to one another with no other groups of tokens between them. Sometimes the points of interest do not maintain a direct spatial relationship (they are not in the same row and not in the same column), but their components may intersect, especially in monetary expressions. Consider the following image:

| | | | | | | | |
|---|---|---|---|---|---|---|---|
| National National Fire & Marine Insurance Company | | | | | | | |
| External Loss Run: Claim Summary Report* | | | | | | | |
| TRN Milwaukee, LLC | | | | | | | |
| No Claims for Policy # NSC100061 | | | | | | | |
| Term | # of Cases | # of Cases Pending | # of Defendants | # of Claims Pending | Indemnity Paid | Expenses Paid | Indemnity Reserve |
| Dec. 31, 2016 to Dec. 31, 2017 | 0 | 0 | 0 | 0 | $0 | $0 | $0 |
| Total: | 0 | 0 | 0 | 0 | $0 | $0 | $0 |

The system would find the total expenses paid are $0 by processing the intersection of the Expenses Paid and Total tokens.

As another example, a first group of tokens comprising the word "United" and an adjacent second group of tokens comprising the word "States" may be grouped together into a combined candidate PoI "United States." In various instances, groups of tokens may intersect by having tokens within the groups share a coordinate. In the example above, for instance, if "United" and "States" are on the same row of text, then each token in the group will share the same coordinate on the horizontal axis. Similarly, if "United"

appears above "States," then some of the tokens in each will share coordinates in the vertical axis (e.g., "U" has the same vertical axis coordinate as "S"). In other embodiments, spatial grouping module 314 is also operable to group groups of tokens that are spatially related but do not intersect. For example, if the sentence "Enrollee John Smith was born in Cumberland, Illinois, studied French art history, and moved to Chicago, Illinois" is analyzed, "Enrollee", "John," "Smith," "studied," and "art history" may be identified as candidate PoIs based on rules in extraction rules and definition module 300. "John" and "Smith" may be grouped because they intersect and "studied" and "art history" may be grouped because they are spatially close together with a single word between them. The identified (and in some instances grouped) candidate PoIs are output to NLP module 320 (line 316).

Figure 5B:
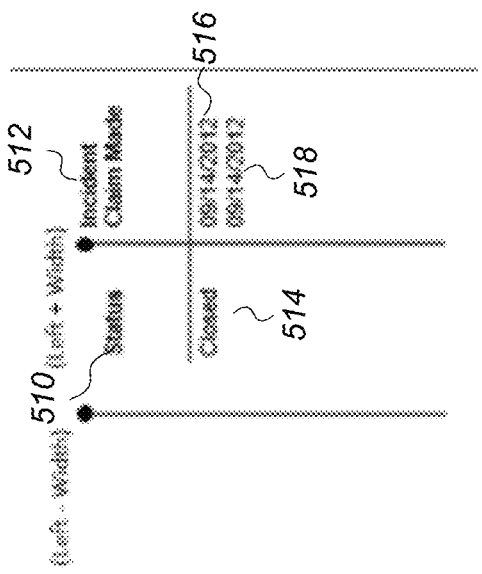
FIGS. 5A-5D are examples of points-of-interest (PoI) identified in electronic documents in accordance with various embodiments.
Figure 5D:
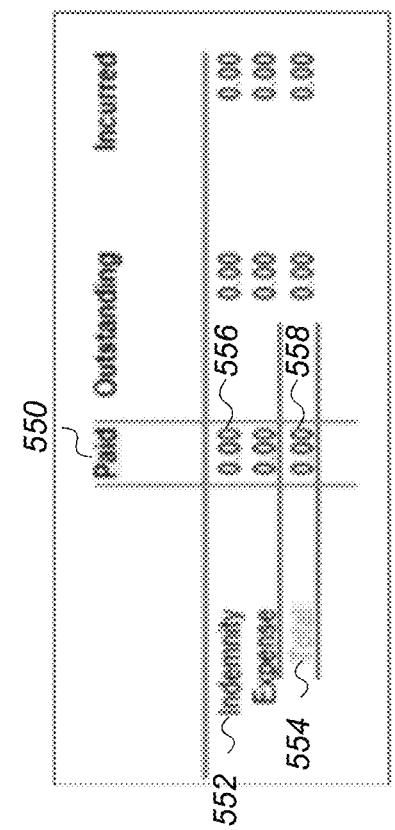

NLP model 320 is operable to receive as input candidate PoIs generated by natural information search module 310 and to output matched sets of label PoIs and data PoIs to match grouping module 340 (line 332). In various embodiments, NLP model 320 includes a grammar analysis module 322 and one or more textual analysis modules such as list module 324, open text module 326, and name entity recognition (NER) modules 328. In various instances, using the textual analysis modules, NLP model 320 is operable to apply a search under algorithm (a result of which is shown in FIG. 5B and discussed in further detail below), a forward search algorithm (a result of which is shown in FIG. 5C and discussed in further detail below), and/or an intersection search algorithm (a result of which is shown in FIG. 5D and discussed in further detail below) on various spatial orientations of text. Thus, spatially proximate PoIs may be grouped together according to the context in which the PoIs are arranged. In various embodiments, the textual analysis modules include thresholds that have been set based on one or more machine learning algorithms applied by an NLP model training module 350. In various embodiments, NLP model 320 includes a coherency module 320 operable to determine that pairings of data PoIs and label PoIs that match grammatical and linguistic criteria are also logically consistent in the context of the electronic document 102. The output of NLP model 320 is sent to match grouping module 340 (line 332) which is operable to group results around a particular data PoI such as reference dates, a serial number, a claim number, or a policy number.

In various embodiments, grammar analysis module 322 is operable to apply grammatical rules to candidate PoIs to attempt to classify the grammatical structure of the candidate PoIs and to use an appropriate textual analysis module that is operable to analyze different grammatical structures. In some embodiments, grammar analysis module 322 may call multiple textual analysis modules in sequence (e.g., determine a set of PoIs is a list and call list module 324 and then call NER module 328 to analyze entities in the list). In some instances, grammar analysis module 322 may determine that a first set of candidate PoIs are associated in a multi-option format that is indicative of a list (e.g., a first PoI is "status," a second PoI is "open," and a third PoI is "closed" and the three PoIs are oriented in a vertical column). In such instances, grammar analysis module 322 calls list module 324 to analyze the set of PoIs. Using one or more rules in extraction rules and definition module 300 (e.g., a determinative rule that first PoI in a list is to be labeled as a label PoI and subsequent PoIs in that list are to be labeled data PoIs), list module 324 is operable to determine which PoIs in the set are data PoIs and which are label PoIs.

In some instances, grammar analysis module 322 may determine that the candidate PoIs are arranged in open text. In some instances, grammar analysis module 322 may make such a determination as a default after determining that a set of candidate PoIs are not arranged in a list. In such instances, grammar analysis module 322 is operable to call open text module 326 to analyze the set of candidate PoIs. In some embodiments, open text module 326 is operable to use prose analysis rules to determine relationships between PoIs. For example, open text module 326 may be operable to identify nouns, verbs, adverbs, and adjectives in a set of PoIs to determine relationships between them. In the example sentence, "Enrollee John Smith was born in Cumberland, Illinois, studied French art history, and moved to Chicago, Illinois" "Enrollee" may be identified as a label PoI and "John Smith" may be identified as a data PoI and grouped with "Enrollee." This determination may be based on a conclusion by open text module 326 that "Enrollee" is not a name but an adjective modifying the name "John Smith."

In some instances, grammar analysis module 322 may determine that some of a set of PoIs are entities that have a specialized linguistic context in the lexicon of the type of electronic documents 102. For example, if electronic documents 102 are all reports pertaining to a certain type of event, an NLP model training module 350 may be used to train the NER module 328 to recognize certain PoIs as different types of PoIs based on trends recognized in a training dataset. For example, the words "status," "open," and "closed" may be contained in a training dataset in different orientations (e.g., in tables that are oriented in different formats) but are consistently correlated such that "status" is used as a label PoI and "open" and "closed" are used as data PoIs. NER module 328 is therefore operable to apply the trends identified in the training dataset to a set of PoIs to classify the PoIs in the electronic document 102 based on the trends.

In various embodiments, coherency module 330 is operable to evaluate a grouping of candidate PoIs based on a coherence determination. In various embodiments, the coherence determination is based on the broader context of the electronic document 102 and is usable to correct false positive matches between label PoIs and data PoIs that match the criteria of the NLP model but are incorrect logically. In various embodiments, the coherence is determined using (a) the electronic document's benchmarks and/or (b) known assumptions, which may be determined using other PoIs identified from the electronic document 102 or may be input by a technician using the system described herein. If, for example, an electronic document 102 is known to be a report relating to two claims, a first pairing of "Claim No." and "123AB" and a second pairing "Claim No." and "123AC" is coherent. In contrast, if an electronic document 102 is known to be a report relating to three claims, and the output of NLP model 320 indicates only a first pairing of "Claim No." and "123AB" and a second pairing "Claim No." and "123AC," then this result is not coherent (i.e., because one claim appears to be missing). As another example, in relation to a particular event if NLP model 320 determines a first pairing of "Open Date" and "Oct. 1, 2020" and a second pairing of "Close Date" and "Oct. 15, 2020," this result is coherent because of the assumption that a close date will be subsequent to an open date (and conversely a pairing where this assumption is not met is determined to be incorrect in various instances).

Match grouping module 340 is operable to receive output matched sets of label PoIs and data PoIs from NLP model 320 (line 332) and group matched sets of PoIs together. In various embodiments, matched sets of label PoIs and data PoIs may be grouped around information associated with the particular electronic document 102 (e.g., references dates, claim numbers, policy numbers, etc.) As discussed above, information extraction module 120 is operable to output extracted information (arrow 360) for storage in a datastore 130. In various embodiments, matched sets of label PoIs and data PoIs are stored in a revised version of the electronic document 102. In various embodiments, the revised version is a table in a format that is universal to for the various electronic documents 102. Accordingly, matched PoIs from a plurality of electronic documents 102 having various formats may be stored in a universal format (e.g., a table). In various embodiments, some or all of the identified tokens that were not classified as PoIs are noted stored. In various instances, these revised versions of the electronic documents 102 utilizes less computer memory than the original electronic documents.

Figure 4:
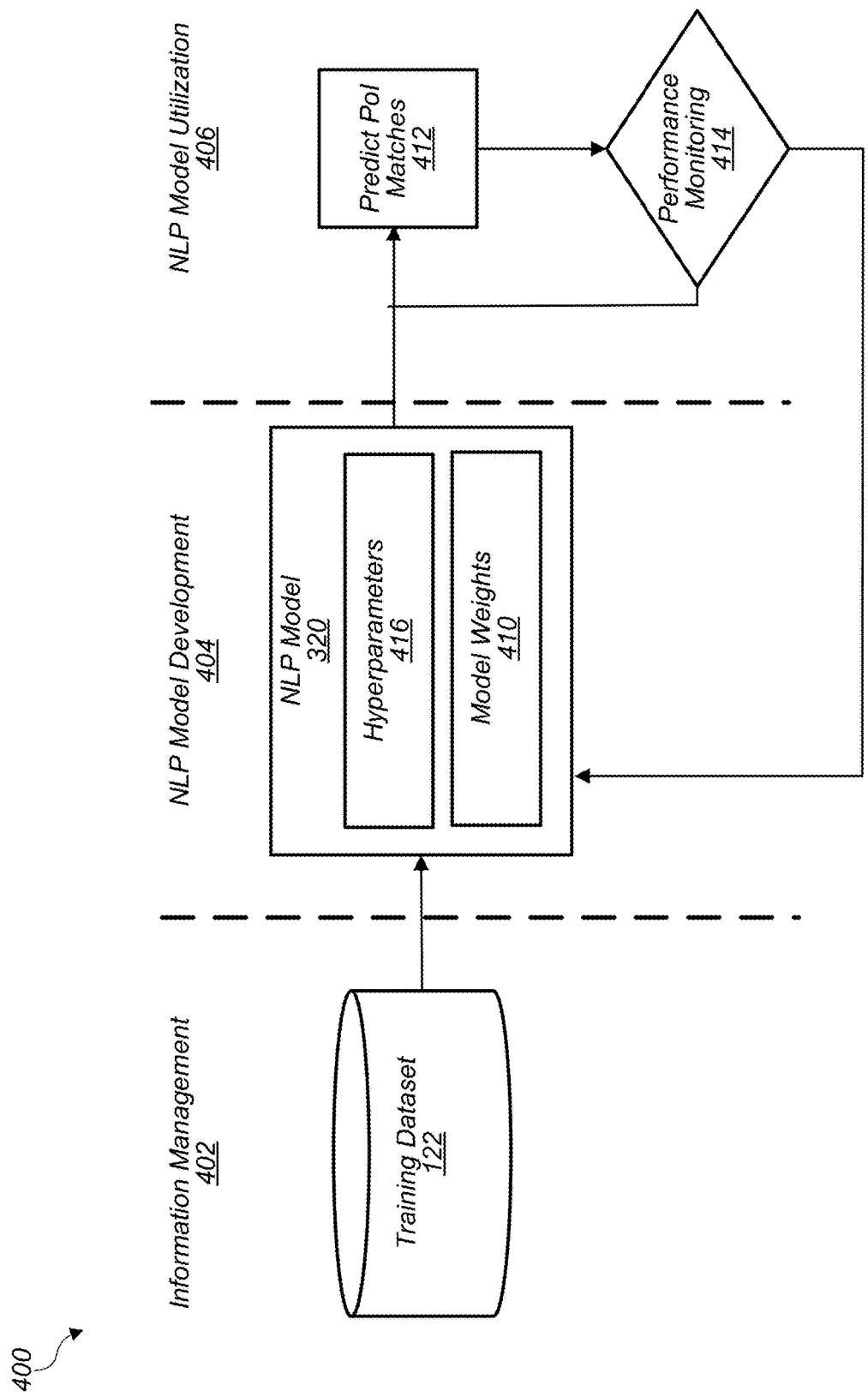
FIG. 4 is a flowchart illustrating an embodiment of a machine learning training and monitoring method in accordance with various embodiments.

FIG. 4 is a flowchart illustrating various embodiments of a machine learning training and monitoring method 400 in accordance with various embodiments. In various embodiments, method 400 is performed using information extraction module 120 and is operable to train NLP model 320. As shown in FIG. 4, method 400 includes three phases: information management 402, NLP model development 404, and NLP model utilization 406. In information management 402, training dataset 122 is maintained. As discussed above, training dataset 122 includes a set of electronic documents that are of a same type as the electronic documents 102 that will be analyzed by computer system 100 (e.g., if electronic documents 102 are incident reports for security breaches, then the documents in training dataset 122 are other incident reports for security breaches). During NLP model development 404, training dataset 122 is applied to NLP model 320 and used to configure hyperparameters 416 of the NLP model 320 (e.g., setting the number of layers and nodes of the NLP model). Additionally, in various embodiments, during NLP model development 404, the various rules and definitions in extraction rules and definitions module 300 are input and/or adjusted. During NLP model development 404, model weights 410 of NLP model 420 are adjusted by one or more suitable training algorithms. During NLP model utilization 406, NLP model 320 is used to predict PoI matches as discussed herein (block 412) and the matches made using NLP model 320 are evaluated (block 414) by a technician or by another machine learning model. If the matches are determined to be accurate, NLP model 320 may be left unadjusted or have one or more model weights 410 be adjusted. If the matches are not accurate, however, NLP model 320 may be adjusted by, for example, changing hyperparameters and/or by adding or changing various rules and definitions in extraction rules and definitions module 300.

Figure 5A:
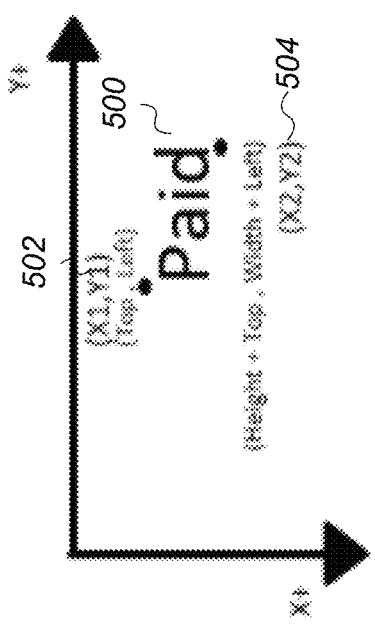
Figure 5C:
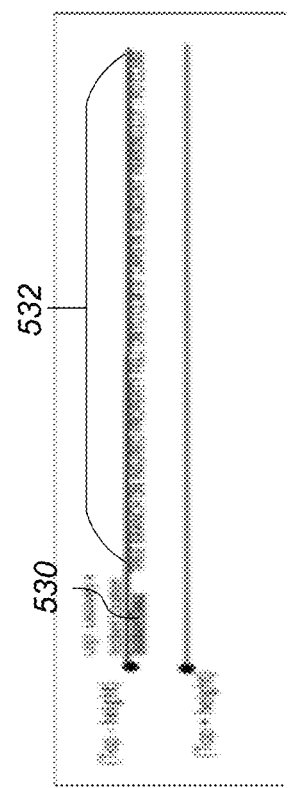

FIGS. 5A-5D are examples of points-of-interest (PoI) identified in electronic documents in accordance with various embodiments. Referring now to FIG. 5A, a single PoI 500 (i.e., the word "Paid") is shown. As discussed herein, PoI 500 is defined by a start point 502 and an endpoint 504 that are themselves defined by coordinates on the X and Y axes of the page of the electronic document. As discussed herein, the various tokens that comprise PoI have been identified and their coordinates recorded (e.g., by document preparation module 110 discussed above). In the English language, text flows from left to right and top to bottom on a page. The PoI is thus defined by indicating a start point 502 at the top-most and left-most portion of PoI 500 and an endpoint 504 at the bottom-most and right-most portion of PoI. Thus, in various instances start point 502 is defined as (X1, Y1) where Y1 is the top-most coordinate of PoI 500 and X1 is the left-most coordinate of the top-most row of PoI 500. Similarly, endpoint 504 is defined as (X2, Y2) where Y2 is the bottom-most coordinate of PoI 500 and X2 is the rightmost coordinate of the bottom-most row of PoI 500. In instances where PoIs are recorded on a single line of text (such as PoI 500), start point 502 has the top-most and left-most coordinates of any character in the PoI (e.g., Top, Left) and endpoint 504 has the bottom-most and rightmost coordinates of any character in the PoI (e.g., Height+Top, Width+Left). PoI 500 is one token tall and four characters wide, so endpoint 504 is located at X2 where X2=Left+the width of four characters and Y2 where Y2=Top+the height of one character. Similarly, in instances where a PoI spans one or more lines of text, X1 is the left-most part of the top line (which is located at Y1) and X2 is the right-most part of the bottom line (which is located at Y2).

Referring now to FIGS. 5B-5D, examples of portions of electronic documents 102 are shown to illustration various search algorithms that may be employed with the techniques discussed herein. As discussed herein, in various instances, distance between PoIs (e.g., distance along a horizontal axis and/or vertical axis) is used to determine matches between data PoIs and label PoIs. In various embodiments, the various potential PoIs identified within a particular electronic document 102 are assigned coordinates determined based on the location of the various tokens on a particular page of the particular electronic document. The search algorithms discussed below may be used to determine distances between various PoIs using these coordinates according to various techniques (e.g., distance along a vertical axis as in FIG. 5B, distances along a horizontal axis as in FIG. 5C, distances along both a vertical and horizontal axis as in FIG. 5D). In these various search techniques, information extraction module 120 is operable to determine a distance between coordinates corresponding to potential PoIs and match, as data PoIs and label PoIs, potential PoIs based in part on this distance. In some embodiments, this includes starting at coordinates corresponding to a given label PoI and searching the particular electronic document 102 for one or more candidate data PoIs that share at least one coordinate with the given label PoI and selecting a particular data PoI from among the one or more candidate data PoIs based on comparing respective distances between respective candidate data PoIs and the given label PoI. In various embodiments, the distance between a matched data PoI and label PoI is the smallest of the respective distances between the respective candidate data PoIs and the label PoI. In various embodiments, information extraction module 120 is operable to exclude data PoIs above a threshold distance from a given label PoI when matching PoIs. In various embodiments, this threshold distance is based on a size of the particular electronic document (e.g., only matches on a same page of the electronic document 102 are included, only matches that are on the same half of a page of the electronic document 102 are included, etc.).

Referring now to FIG. 5B, an example of PoIs being matched using a "search under" algorithm is shown. In various instances, a search under algorithm may be employed when PoIs are arranged in columns (as in a table) and may be able to match a first PoI with one or more PoIs underneath the first PoI. Since each group of tokens extracted by document preparation module 110 have four coordinates (i.e., the beginning x1, y1 of the group on the X and Y axes and the end x2, y2 of the group in the X and Y axes), it is possible to group the words that are in the same column in various instances. When the search under algorithm is applied, if there is a potential forward search match (e.g., if there are PoIs on the same row), information extraction module 120 examines the Y axis coordinates for the PoIs. Information extraction module 120 identifies the PoIs for which coordinates wy1, wy2 fit in the same column, where wx1, wx2, wy1, wy2 are the bounding boxes for a given word w. In various instances, the determination of whether two PoIs are in the same column is determined based on the y1 coordinates of the PoIs being less than wy2 and the y2 coordinates of the PoIs being greater than wx1. Here, wy2 and wx1 represent coordinates of the bottom-left corner of word bounding box If two PoIs are determined to be in the same column, NLP model 320 is used to determine whether the meanings of the PoIs should be matched as a label PoI and a data PoI. As shown in FIG. 5B, five PoIs 510, 512, 514, 516, 518 have been identified. PoI 510 "Status" and PoI 512 "Incident Claim Made" are on the same row (e.g., they are potential matches using the forward search algorithm), but PoI 510 is also in the same column as PoI 514 "Closed." If training indicates that "Status" is more likely to be a label PoI, then NLP model 320 may determine that matching PoI 510 and to PoI 514 is the best match. Similarly, PoI 512 shares a column with PoIs 516 and 518. While PoI 514 might be matched with PoIs 516 and 518 as a forward search match, because PoI 514 has been determined to be a data PoI and PoIs 516 and 518 share a column with PoI 512, then NLP model 320 may determine that PoIs 516 and 518 are also data PoIs and that matching PoI 516 and 518 and to PoI 512 is the best match.

Referring now to FIG. 5C, an example of PoIs being matched using a "forward search" algorithm is shown. In various instances, a forward algorithm may be employed when PoIs are arranged in rows (as in a prose) and may be able to match a first PoI with one or more PoIs to the right of the first PoI. While the example in FIG. 5C is a sentence in the English language, which flows from left to right, it will be understood that these techniques may be modified to apply to languages that flow from right to left. Since each group of tokens extracted by document preparation module 110 have four coordinates (i.e., the beginning x1, y1 of the group on the X and Y axes and the end x2, y2 of the group in the X and Y axes), it is possible to group the words that are in the same row in various instances. When the search forward algorithm is applied, information extraction module 120 examines the X axis coordinates (e.g., x1 and x2) for the PoIs. Information extraction module 120 identifies the PoIs for which coordinates wx1, wx2 fit in the same row. In various embodiment, this identification of coordinates indicating PoIs are in the same row is limited by the size of electronic document 102 (e.g., only PoIs on the same row that are on the same page are matched). If two PoIs are determined to be in the same row, NLP model 320 is used to determine whether the meanings of the PoIs should be matched as a label PoI and a data PoI. As shown in FIG. 5C, two PoIs 530 and 532 have been identified. PoI 530 "Incident Desc:" and PoI 532 "TREE BRANCH ON INSURED PROPERTY FELL ONTO CARES IN ADJACENT PARKING LOT/PO CLAIM" are on the same row. If training indicates that "Incident Desc." corresponds to a string of open text like PoI 532, then NLP model 320 may determine that matching PoI 530 to PoI 532 is a valid match.

Referring now to FIG. 5D, an example of PoIs being matched using an "intersection search" algorithm is shown. In various instances, an intersection search algorithm may be employed when PoIs are arranged in columns (as in a table) and may be able to match a multiple label PoIs with a particular data PoI. In various instances, an intersection search may be applied in the event that a data PoI is matched to a first label PoI (e.g., using a search under algorithm) and a second label PoI (e.g., using a forward search algorithm). In such instances, information extraction module 120 examines the X and Y axis coordinates (e.g., x/and x2) for the two label PoIs. In various instances, information extraction module 120 identifies, from among the two label PoIs, a first label PoI that is higher on the page of electronic document 102 and a second label PoI that is lower on the page of electronic document 102. Then, information extraction module 120 performs a search under beneath the first label PoI and a forward search to the right of the second label PoI (in languages that flow left to right like English, but the reverse could be employed in right to left flowing languages). If a particular data PoI is identified by both the search under and the forward search, the particular data PoI may be matched with both the first and second label PoI in various instances. Then, NLP model 320 is used to determine whether the meanings of the PoIs should be matched as label PoIs and corresponding a data PoI. Thus, in some instances determining that a first label PoI and a second label PoI matches a particular data PoI is based on (a) the first label PoI sharing an x-axis coordinate with the particular data PoI, (b) the second label PoI sharing a y-axis coordinate with the particular data PoI, and (c) a determination by the natural language processing algorithm that one or more tokens of the particular data PoI corresponds to one or more tokens of the first label PoI and one or more tokens of the second label PoI. As shown in FIG. 5D, five PoIs 550, 552, 554, 556, and 558 have been identified. PoI 550 "Paid" is above PoIs 556 and 558. PoI 552 "Indemnify" is to the right of PoI 556 and PoI 554 "Total" is to the right of PoI 558. By applying the intersection search algorithm, PoI 556 is matched as a data PoI to label PoIs 550 and 552 (because PoI 556 is at the intersection of the column below PoI 550 and of the row to the right of PoI 552) and PoI 558 is matched as a data PoI to label PoIs 550 and 554 (because PoI 558 is at the intersection of the column below PoI 550 and of the row to the right of PoI 554).

Figure 6:
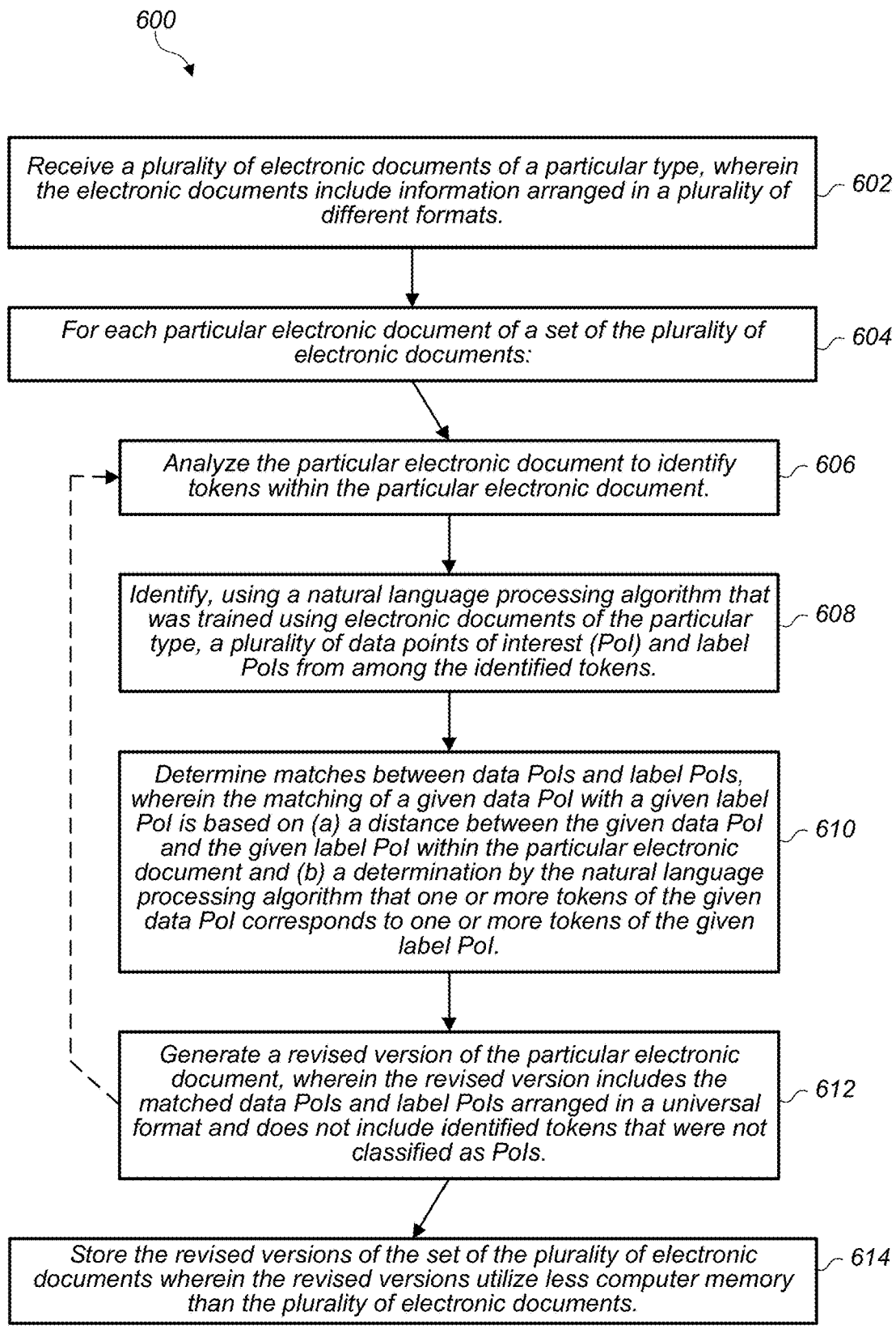
FIG. 6 is flowchart illustrating an embodiment of an information extraction method in accordance with the various embodiments.

Referring now to FIG. 6, a flowchart depicting an information extraction method 600 is depicted. In the embodiment shown in FIG. 6, the various actions associated with method 600 are implemented by computer system 100. At block 602, computer system 100 receives a plurality of electronic documents 102 of a particular type, wherein the electronic documents include information arranged in a plurality of different formats. At blocks 604-612, for each particular electronic document 102 of a set of the plurality of electronic documents 102, computer system 100 performs various tasks including: analyzing the particular electronic document 102 to identify tokens within the particular electronic document 102 (block 606); identifying using a natural language processing model 320 that was trained using electronic documents 102 of the particular type, a plurality of data points-of-interest (PoI) and label PoIs from among the identified tokens (block 608); determining matches between data PoIs and label PoIs, wherein the matching of a given data PoI with a given label PoI is based on (a) a distance between the given data PoI and the given label PoI within the particular electronic document 102 and (b) a determination by the natural language processing model 320 that one or more tokens of the given data PoI corresponds to one or more tokens of the given label PoI (block 610); and generating a revised version of the particular electronic document 102, wherein the revised version includes the matched data PoIs and label PoIs arranged in a universal format and does not include identified tokens that were not classified as PoIs. At block 612, computer system 100 stores the revised versions of the set of the plurality of electronic documents 102 wherein the revised versions utilize less computer memory than the plurality of electronic documents 102.

Exemplary Computer System

Figure 7:
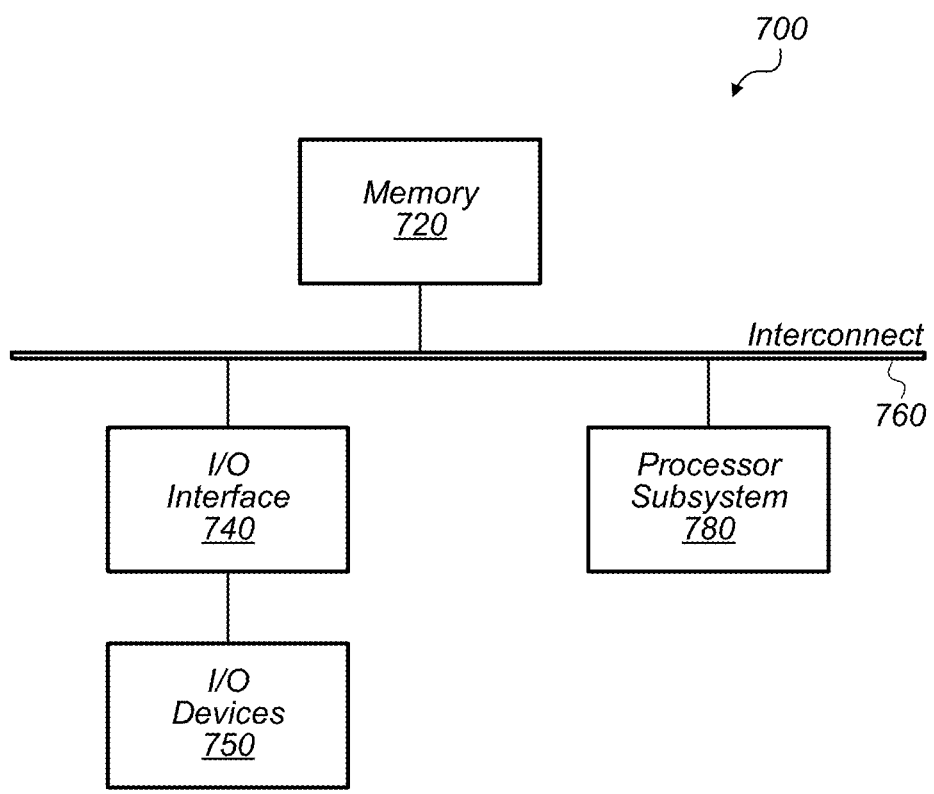
FIG. 7 is a block diagram of an exemplary computer system, which may implement the various components of FIGS. 1, 2, and 3.

Turning now to FIG. 7, a block diagram of an exemplary computer system 700, which may implement the various components of computer system 100 is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable to store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780.

I/O interfaces 740 may be any of various types of interfaces configured to couple to and communicate with other devices, according to various embodiments. In one embodiment, I/O interface 740 is a bridge chip (e.g., Southbridge) from a front-side to one or more backside buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device (e.g., configured to communicate over WiFi, Bluetooth, Ethernet, etc.), another example of an I/O device 750.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for automated information extraction from electronic documents, the method comprising:
   receiving, at a computer system, a plurality of electronic documents of a particular type, wherein the electronic documents include information arranged in a plurality of different formats;
   for each particular electronic document of a set of the plurality of electronic documents:
   analyzing, by the computer system, the particular electronic document to identify tokens within the particular electronic document;
   identifying, by the computer system using a natural language processing model that was trained using electronic documents of the particular type, a plurality of data points-of-interest (PoI) and label PoIs from among the identified tokens;
   determining, by the computer system, matches between data PoIs and label PoIs, wherein the matching of a given data PoI with a given label PoI is based on (a) a distance between the given data PoI and the given label PoI within the particular electronic document and (b) a determination by the natural language processing model that one or more tokens of the given data PoI corresponds to one or more tokens of the given label PoI; and
   generating a revised version of the particular electronic document, wherein the revised version includes the matched data PoIs and label PoIs arranged in a universal format and does not include identified tokens that were not classified as PoIs; and
   storing, at the computer system, the revised versions of the set of the plurality of electronic documents wherein the revised versions utilize less computer memory than the plurality of electronic documents.

2. The method of claim 1, wherein the analyzing includes:
   converting the particular electronic document into one or more images;
   using an optical character recognition algorithm to identify the tokens within the one or more images; and
   determining coordinates of the identified tokens within the one or more images.

3. The method of claim 2, wherein the distance is measured by determining a distance between coordinates corresponding to the given data PoI and the given label PoI.

4. The method of claim 1, wherein the matching of the given data PoI and the given label PoI includes:

starting at coordinates corresponding to the given label PoI, searching the particular electronic document for one or more candidate data PoIs, wherein the one or more candidate data PoIs share at least one coordinate with the given label PoI; and selecting the given data PoI from among the one or more candidate data PoIs based on comparing respective distances between respective candidate data PoIs and the given label PoI.

5. The method of claim 4, wherein the distance between the given data PoI and the given label PoI is the smallest of the respective distances between the respective candidate data PoIs and the given label PoI.

6. The method of claim 4, wherein searching the particular electronic document includes excluding data PoIs above a threshold distance from the given label PoI, wherein the threshold distance is based on a size of the particular electronic document.

7. The method of claim 4, wherein selecting the given data PoI from among the one or more candidate data PoIs is further based on a coherence between the respective candidate data PoIs and the given label PoI.

8. The method of claim 1, wherein determining matches between data PoIs and label PoIs includes:

for a particular data PoI, determining that a first label PoI and a second label PoI match the particular data PoI based on (a) the first label PoI sharing an x-axis coordinate with the particular data PoI, (b) the second label PoI sharing a y-axis coordinate with the particular data PoI, and (c) a determination by the natural language processing model that one or more tokens of the particular data PoI corresponds to one or more tokens of the first label PoI and one or more tokens of the second label PoI.

9. The method of claim 1, further comprising:

training, by the computer system using a machine learning algorithm, the natural language processing model using a second set of the plurality of electronic documents.

10. The method of claim 1, wherein the plurality of electronic documents includes electronically-scanned paper documents.

11. A non-transitory, computer-readable medium storing instructions that when executed by a computer system cause the computer system to perform operations comprising:

training, with a computer system, a natural language processing model using a plurality of a particular type of electronic documents;

receiving, at a computer system, a plurality of electronic documents of the particular type, wherein the electronic documents include information arranged in a plurality of different formats, for each particular electronic document of a set of the plurality of electronic documents:

analyzing, by the computer system, the particular electronic document to identify tokens within the particular electronic document;

identifying, by the computer system using the natural language processing model, a plurality of data points-of-interest (PoIs) and label PoIs from among the identified tokens;

determining, by the computer system, matches between data PoIs and label PoIs, wherein the matching of a given data PoI with a given label PoI is based on (a) a distance between the given data PoI and the given label PoI within the particular electronic document and (b) a determination by the natural language processing model that one or more tokens of the given data PoI corresponds to one or more tokens of the given label PoI; and generating a revised version of the particular electronic document, wherein the revised version includes the matched data PoIs and label PoIs arranged in a universal format and does not include identified tokens that were not classified as PoIs; and storing, at the computer system, the revised versions of the set of the plurality of electronic documents.

12. The non-transitory, computer-readable medium of claim 11, where identifying the plurality of data PoIs and label PoIs is based on a spatial relationship between the identified tokens.

13. The non-transitory, computer-readable medium of claim 11, wherein the matching of the given data PoI and the given label PoI includes:

starting at coordinates corresponding to the given label PoI, searching the particular electronic document for one or more candidate data PoIs, wherein the one or more candidate data PoIs share at least one coordinate with the given label PoI; and selecting the given data PoI from among the one or more candidate data PoIs based on comparing respective distances between respective candidate data PoIs and the given label PoI.

14. The non-transitory, computer-readable medium of claim 13, wherein the distance between the given data PoI and the given label PoI is the smallest of the respective distances between the respective candidate data PoIs and the given label PoI.

15. The non-transitory, computer-readable medium of claim 11, wherein determining matches between data PoIs and label PoIs is further based on a coherency determination between the given data PoI and the given label PoI.

16. The non-transitory, computer-readable medium of claim 11, wherein determining matches between data PoIs and label PoIs includes:

for a particular data PoI, determining that a first label PoI and a second label PoI match the particular data PoI based on (a) the first label PoI sharing an x-axis coordinate with the particular data PoI, (b) the second label PoI sharing a y-axis coordinate with the particular data PoI, and (c) a determination by the natural language processing model that one or more tokens of the particular data PoI corresponds to one or more tokens of the first label PoI and one or more tokens of the second label PoI.

17. The non-transitory, computer-readable medium of claim 16, wherein determining that the first label PoI and the second label PoI match the particular data PoI is further based on a coherency determination between one or more tokens of the first label PoI and one or more tokens of the second label PoI.

18. A non-transitory, computer-readable medium storing instructions that when executed by a computer system cause the computer system to perform operations comprising:

receiving, at a computer system from an entity, a transaction request;

receiving, at the computer system, a plurality of electronic documents, wherein the electronic documents include information arranged in a plurality of different formats, wherein at least a portion of the electronic documents correspond to the entity, for each particular electronic document of a set of the plurality of electronic documents:

identifying, by the computer system using a natural language processing model, a plurality of data points-of-interest (PoI) and label PoIs from among tokens in the particular electronic document;
identifying, by the computer system, a plurality of matches between data PoIs and label PoIs, wherein:
  a first match is based on (a) a horizontal distance between a first label PoI and a first data PoI and (b) a determination by the natural language processing model that one or more tokens of the first label PoI corresponds to one or more tokens of the first data PoI; and
  a second match is based on (a) a vertical distance between a second label PoI and a second data PoI and (b) a determination by the natural language processing model that one or more tokens of the second label PoI corresponds to one or more tokens of the second data PoI; and
storing a revised version of the particular electronic document, wherein the revised version includes the matched data PoIs and label PoIs arranged in a universal format and does not include identified tokens that were not classified as PoIs; and
responding, by the computer system, to the transaction request using the revised version of the set of the plurality of electronic documents.

19. The non-transitory, computer-readable medium of claim 18, wherein the operations further include:
training, with the computer system, the natural language processing model using training set of electronic documents of a same type as the plurality of electronic documents.

20. The non-transitory, computer-readable medium of claim 18,
wherein the first match is further based on a first coherency determination between the first data PoI and the first label PoI; and
wherein the second match is further based on a second coherency determination between the second data PoI and the second label PoI.

\* \* \* \* \*